July 13, 1954  D. K. HOPKINS  2,683,790
ELECTRICAL WELDING APPARATUS
Filed March 30, 1951  3 Sheets-Sheet 1

INVENTOR:
Durward Kenneth Hopkins,
BY E. L. Borth,
ATTORNEY.

July 13, 1954  D. K. HOPKINS  2,683,790
ELECTRICAL WELDING APPARATUS
Filed March 30, 1951  3 Sheets-Sheet 2
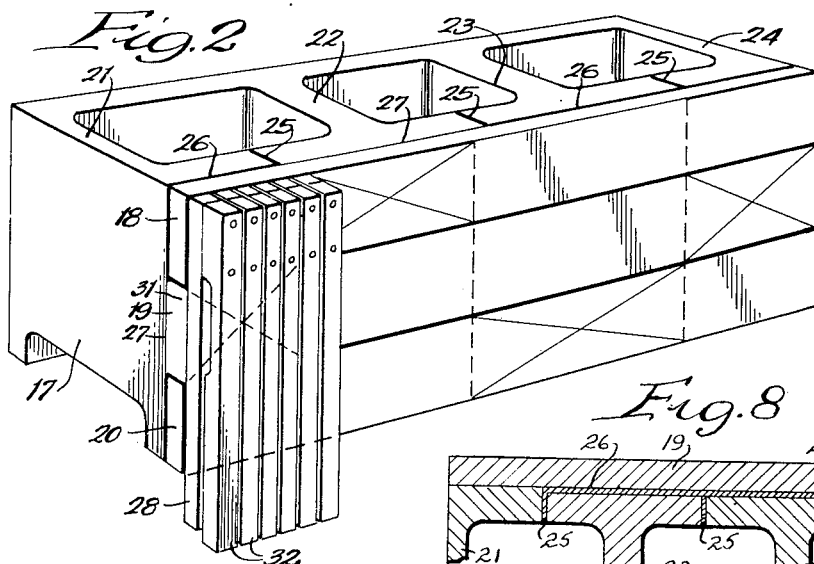
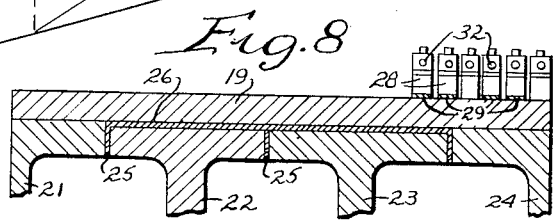
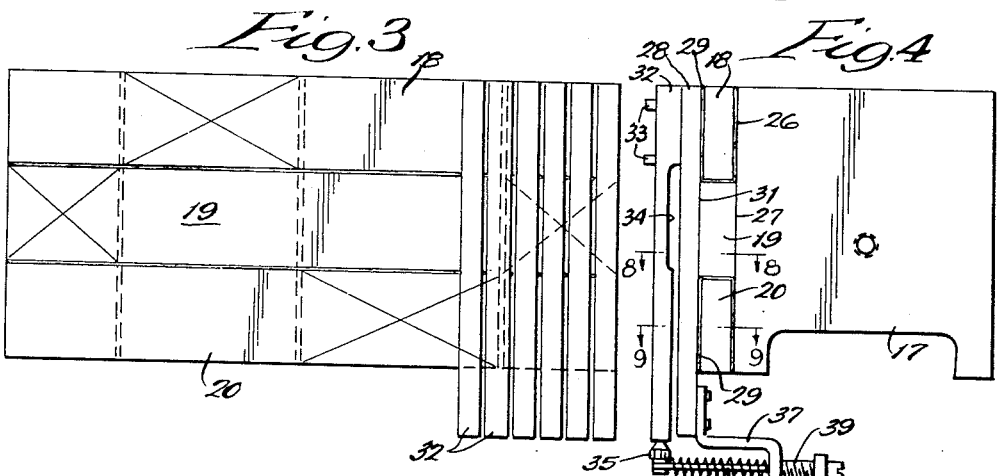
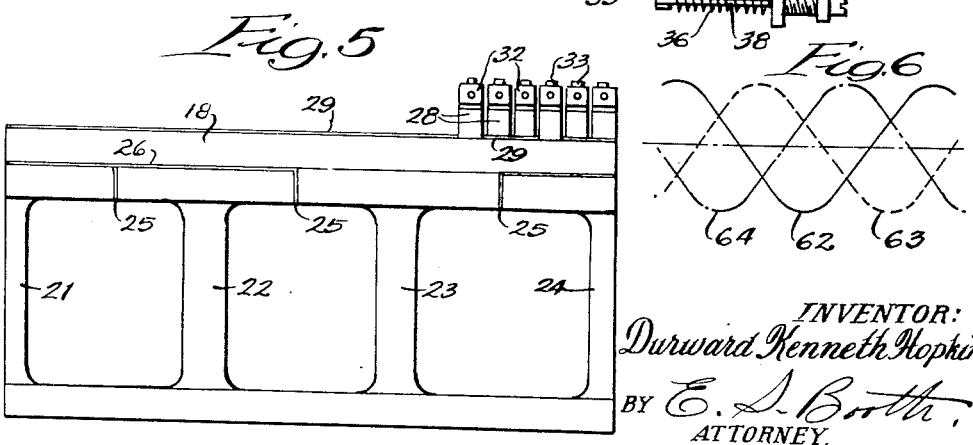
INVENTOR:
Durward Kenneth Hopkins,
BY E. S. Booth
ATTORNEY.

July 13, 1954  D. K. HOPKINS  2,683,790
ELECTRICAL WELDING APPARATUS
Filed March 30, 1951  3 Sheets-Sheet 3

INVENTOR
Durward Kenneth Hopkins
BY
ATTORNEY

Patented July 13, 1954

2,683,790

UNITED STATES PATENT OFFICE 2,683,790

ELECTRICAL WELDING APPARATUS

Durward Kenneth Hopkins, Peoria, Ill., assignor to Peoria Steel and Wire Company, Peoria, Ill., a corporation of Illinois Application March 30, 1951, Serial No. 218,334

7 Claims. (Cl. 219—4)

This invention relates to electrical welding apparatus and more particularly, to apparatus for performing a plurality of electrical welding operations simultaneously.

In the manufacture of various types of devices it is desirable to perform a plurality of identical or substantially identical welding operations simultaneously. One operation of this type is in the manufacture of welded mesh fencing or the like, in which wire strands are welded together at each point where they cross. In such machines it is preferred to perform a series of welding operations simultaneously and it is furthermore important that the welding current through each weld be the same so that the several welds will be identical. It is further important when a polyphase source of current is employed that a balance between the phases be maintained and that the peak loads be eliminated.

It is one of the objects of the present invention to provide electrical welding apparatus in which the several important requirements of a multiple welding operation are satisfied.

Another object is to provide welding apparatus in which polyphase welding circuits are completed through the work and through conducting supporting means for the work. This not only insures identical welds but maintains the welding load balanced regardless of changes in welding voltage or time and imposes a continuous load on the power supply during a welding operation.

According to one feature of the invention, the welding electrodes are arranged in sets and are connected respectively to the secondary terminals of a three-phase welding transformer.

Still another object of the invention is to provide welding apparatus in which the welding current is supplied by a transformer having a rigid frame forming a single turn, delta-connected secondary and on which the electrodes are directly mounted.

According to this arrangement, the structure of the mechanism is substantially simplified and the inductive losses are minimized due to the proximity of the electrodes to the transformer and to each other and to the fact that neighboring fluxes of opposite polarity cancel each other.

Another feature of the invention relates to the provision of a simple but highly efficient mounting for the electrodes by which the electrode pressure can easily be adjusted or the electrodes can selectively be made inoperative when desired.

A further object is to provide welding apparatus in which a plurality of welding units are energized in cascade to limit the peak load on the line. In the preferred construction the control for each welding unit operates the control for a succeeding unit to produce the cascade operation.

A still further object is to provide a control system for welding apparatus in which the welding time is accurately controlled and can easily be adjusted.

The above and other objects and features of the invention will be more readily apparent from the following description when read in connection with the accompanying drawings in which:

Figure 2 is a partial perspective view of a welding transformer according to the invention, with the primary windings and core and a majority of the electrode holders omitted;

Figure 3 is a front elevation of the transformer with the electrode holders at the left omitted.

Figure 4 is an end elevation of the transformer looking from the right end of Figure 3 showing the electrodes and the adjusting means therefor;

Figure 5 is a plan view of the transformer looking from the top of Figures 3 and 4;

Figure 6 is a diagram illustrating welding current conditions;

Figure 7:
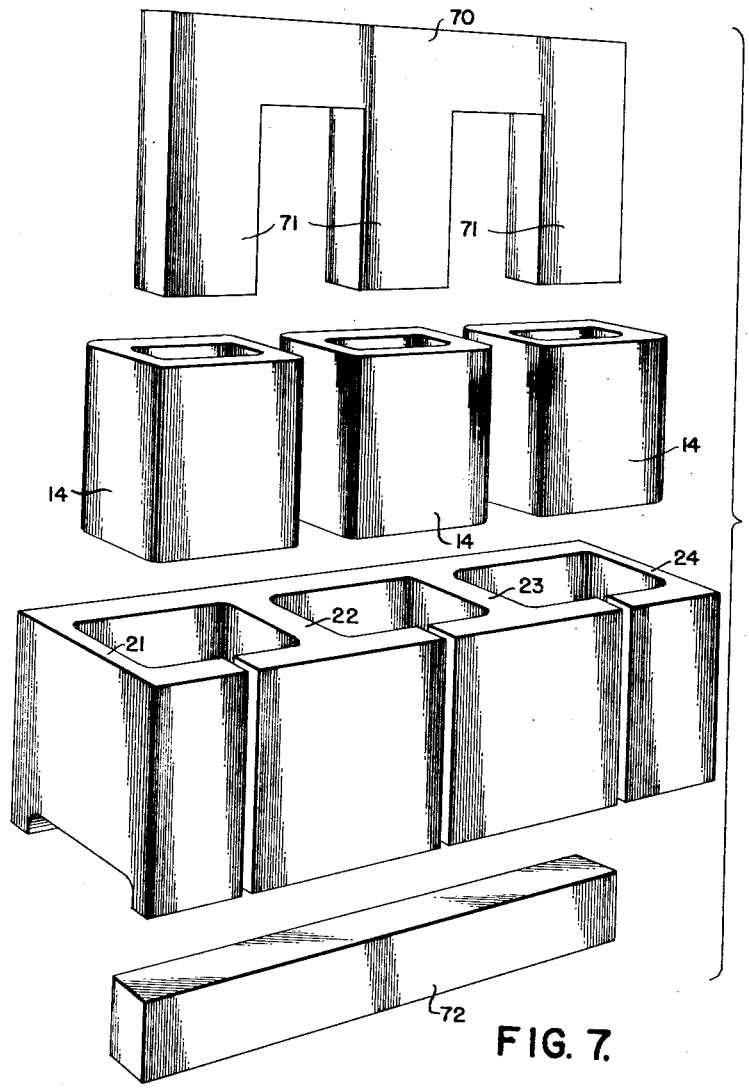
Figure 9:
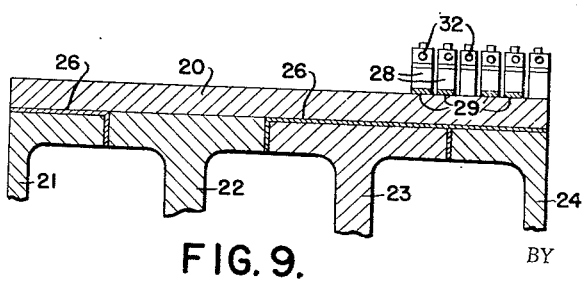

Figure 7 is a perspective view of the transformer disassembled; and Figures 8 and 9 are partial sections on the lines 8—8 and 9—9 respectively of Figure 4.

Figure 1:
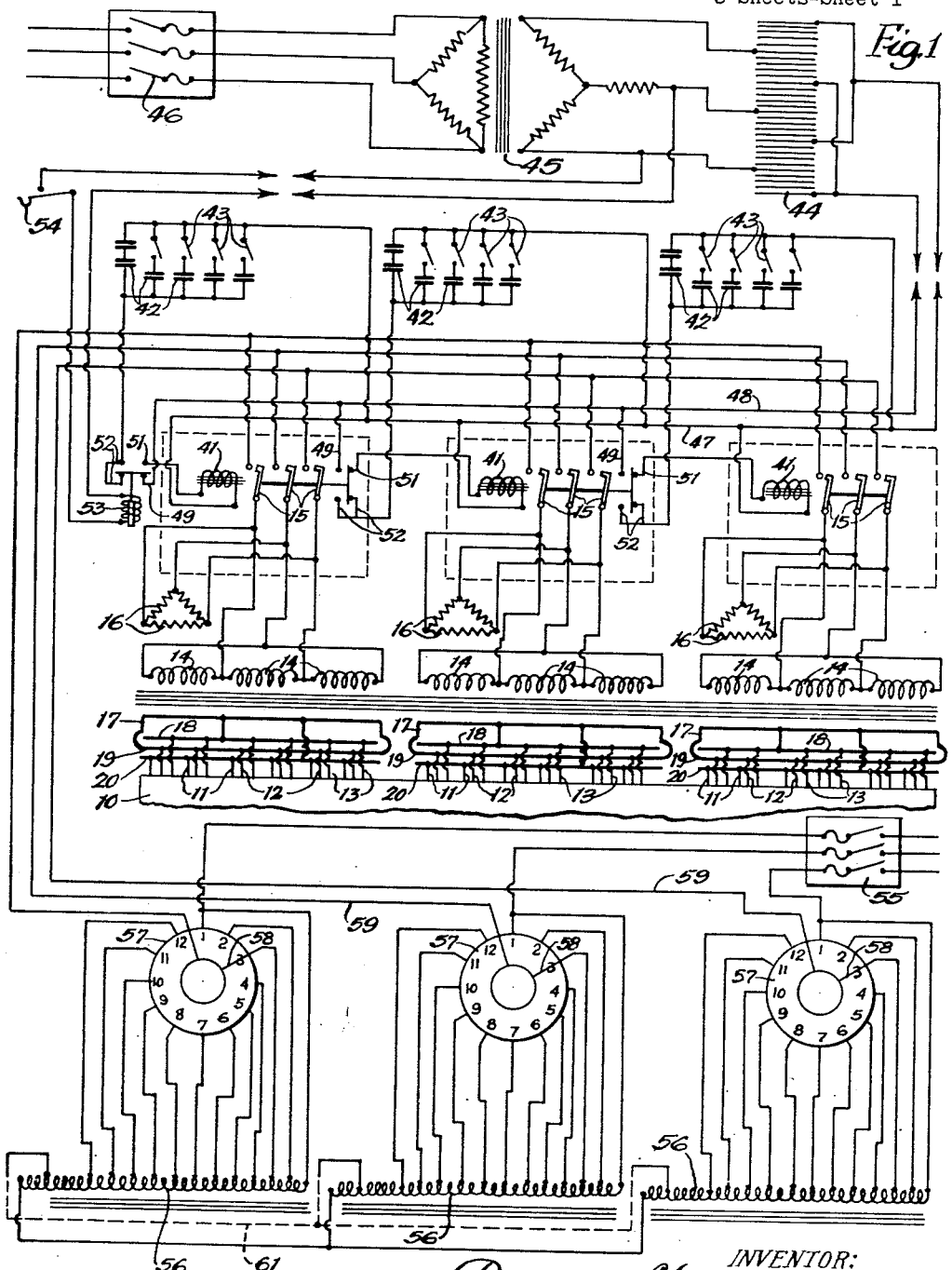
Figure 1 is a circuit diagram of an electric welding apparatus embodying the invention.

The apparatus as illustrated in Figure 1, includes a work supporting means 10 formed of conductive material such as copper or other desired metal, and which is adapted to hold the work pieces to be welded to carry them in contact with the electrodes. For example, the work supporting means 10 may be a rotatable drum as more particularly disclosed in my co-pending application, Serial No. 239,146, filed July 28, 1951, for carrying the crossing wires of a wire mesh fabric beneath the electrodes. It will be understood, however, that the electrical features as disclosed and claimed in this application can be applied to various other types of multiple welding operations.

The work pieces on the supporting means 10 are engaged at points where they are to be welded by a plurality of spaced electrodes. The electrodes are divided into sets corresponding in number to the number of phases in the supply source. As shown, a three-phase supply source is employed and three sets of electrodes 11, 12 and 13 are accordingly employed. As illustrated, the electrodes of different sets are alternated although this arrangement is not critical.

The sets of electrodes are connected respectively to the different phases of a three-phase supply. As shown, the electrodes are supplied by welding transformers, there being three transformers illustrated, which are identical to each other to limit the peak load although one or more transformers could be used as desired depending upon the importance of limiting the peak load. Each transformer includes three primary windings 14 which are delta-connected to the respective poles of a three-pole switch indicated at 15. Thyrite resistors 16 also connected in delta may be connected in parallel to the transformer windings as illustrated to drain off harmonics and transient voltages above the resistor voltage ratings.

Each transformer includes a single turn secondary indicated generally at 17 in Figure 1, and having terminals for the different phases connected respectively to contact bars 18, 19 and 20. The electrodes 11 are connected to one of the contact bars shown as 20, the electrodes 12 are connected to a second contact bar shown as 19, and the electrodes 13 are connected to the third contact bar shown as 18. It will be noted that the contact bars are insulated from each other so that when the primary windings 14 are energized from a three-phase supply source, the sets of electrodes will be supplied respectively with the different phases of the secondary voltage.

The construction of the transformers is more particularly illustrated in Figures 2 to 5 and 7. As shown, the single turn secondary comprises a metal frame which may be cast or otherwise formed of copper or the like, and which has four legs 21, 22, 23 and 24. The legs are insulated from each other as by means of insulating strips 25 and provide between them openings in which the primary windings can be mounted. In the construction shown, the legs 21 and 24 correspond to the same phase in the secondary and are preferably thinner than the legs 22 and 23 which correspond to the remaining two-phases and which must each carry the same amount of current as the legs 21 and 24 together.

The construction of the transformer is more fully shown in Figure 7. As there illustrated, the coils 14 are in the form of tubular coils with the turns running circumferentially around the tubular shaping and are of such a size and shape that they will fit into the openings between the legs 21, 22, 23, and 24. The coils are preferably supported on an E-shaped magnetic core 70, having three legs 71 to fit into the coils respectively and of a length to extend through the transformer secondary frame. A bar 72 of magnetic material is adapted to connect the ends of the legs 71 when they are assembled in the frame to form a complete magnetic circuit interlacing the coils.

The contact bars 18, 19 and 20 extend the full length of the frame across the outer ends of the legs and are secured to the legs in any desired manner. Each of the contact bars is insulated from two of the legs and is electrically connected to the other leg so that each contact bar provides a terminal for a single phase of the welding voltage. As shown, the upper contact bar 18 is electrically connected to the leg 22 and is insulated from the remaining legs 21, 23 and 24. For this purposes, insulating material as shown at 26 is mounted between the inner face of the contact bar 18 and the outer faces of the legs 21, 23 and 24 while a conducting spacer 27 may be mounted between the end of the leg 22 and the contact bar to establish an electrical connection therebetween.

In similar manner, the conductor bar 19 is connected by conducting spacers 27 to the two end legs 21 and 24 and is insulated from the remaining legs 22 and 23. The bottom conducting bar 20 is similarly electrically connected to the leg 23 and is insulated from the remaining legs 21, 22 and 24.

According to one feature of the invention, the transformer secondary frame is adapted to carry the electrodes directly. For this purpose, the conductor bars are adapted to carry a plurality of mounting bars 28 corresponding in number to the number of electrodes and connected respectively in sets to the conductor bars 18, 19 and 20. As shown, the mounting bars extend across all of the conductor bars and each mounting bar is insulated from two of the conductor bars while electrically contacting the third bar. As shown in Figures 2 and 4, the left-hand mounting bar 28 is insulated from the conducting bars 18 and 20 by insulating material 29, and is electrically connected to the center conducting bar 19 by a conducting spacer 31.

The next mounting bar is similarly insulated from the conducting bar 19 and one of the conducting bars 18 or 20 while the third mounting bar is insulated from the bar 19 and the other bar 18 or 20. In this way, the mounting bars are connected alternately to the conducting bars as indicated diagrammatically in Figure 1. Each of the mounting bars carries an elongated electrode supporting bar 32 which lies generally parallel to the mounting bar and is of approximately the same length. At one end each electrode supporting bar 32 is thickened and is secured rigidly in face to face relation with the associated mounting bar 28 by means of bolts 33 or like fastenings.

Immediately above the thickened part the supporting bars are thinned as indicated at 34 to increase their flexibility and throughout the remainder of their lengths lie spaced from the adjacent mounting bars. In this way, the electrode supporting bars lie parallel and relatively close together and are resilient to support the electrodes.

As best shown in Figure 4, each electrode supporting bar 32 carries at its free end an electrode 35 which may be rotatably mounted in the end of the supporting bar and formed in its periphery with grooves to receive the wires to be welded. This construction is preferably employed so that as the electrodes wear they can be turned to present different surfaces to the work or so that different sized grooves or handling different diameter wire can be presented selectively as required. The electrodes are normally held against the work by the resilience of the supporting bars 32 and additionally may be pressed against the work by coil springs 36 acting between the upper ends of the electrodes and brackets 37 rigidly secured to the mounting bars.

In order to relieve the tension on any electrode or to draw it completely out of contact with the work, a rod 38 may be connected to each electrode and threaded into a sleeve 39 carried by the bracket 37. By turning the sleeve 39 the rod can be tensioned to any desired extent to relieve the pressure on its corresponding electrode or to move the electrode out of contact with the work to an inoperative position. In this way any desired number less than all of the electrodes may be used for narrower work requring a relatively smaller number of welds.

The switches for supplying the transformers are normally open as shown, and each switch has associated therewith a solenoid or coil 41 to pull it temporarily to closed position. The time interval during which each switch is closed determines the welding time, a welding operation being initiated as soon as a switch is closed and being terminated as soon as the switch is opened.

In order to control accurately the welding time, each coil 41 is adapted to be energized by the discharge of a condenser or series of condensers. As shown, each coil has associated therewith a plurality of condensers 42 which can be selectively cut into or out of circuit by switches 43 so that the effective capacity in the circuit can easily be controlled to vary the welding time. The condensers are adapted to be charged from a D. C. source shown as a three-phase rectifier 44 supplied by a three-phase transformer 45 connected through a switch 46 to a three-phase source.

One side of the rectifier output indicated at 47, leads to one end of each solenoid 41. The other side 48 of the D. C. source leads to a contact 49 in a 2-pole double throw switch which is associated with each of the coils. The other end of each coil goes to a contact 51 in its associated switch. Additionally the line 47 is connected to one side of each of the sets of condensers 42 and the other side of each set of condensers is connected to a pair of contacts 52 in each of the switches.

The left-hand switch for controlling the first of the series of transformers is normally in the position shown to bridge the contact 49 and one of the contacts 52. This connects the corresponding condensers in the D. C. circuit so that the condensers will be charged. The switch is adapted to be moved to its second position connecting contact 51 with one of the contacts 52 by a coil 53 which is connected through a starting switch 54 with a source shown as one of the output phases of the transformer 45. The switches for the succeeding transformer units normally occupy their illustrated positions in which they connect one of the contacts 52 with the contact 51. These switches are mechanically connected respectively with the blades for the main switch 15 of a preceding unit so that they will be thrown to bridge contacts 49 and 52 when the coil 41 of the preceding unit is energized.

Welding current is supplied to the transformers through the switches 15 from a suitable three-phase source connected through a switch 55. In order that the welding voltage can easily be regulated, each phase of the welding current supply is connected through one winding of a Y connected 3-phase auto transformer with tap switches shown at the bottom of Figure 1. As illustrated, three control units are provided, each including a winding 56 and the several windings are connected in a Y or star type of connection. Each winding has a plurality of taps thereon connected to terminals around the periphery of a disc 57 and the terminals are adapted to be engaged by a wiper 58 which may be turned by rotating a center contact to effect the desired connection. The center contacts are connected to lines 59 leading to the switches in parallel as shown. Additionally, short sections of each of the windings 56 may be interconnected as indicated in dotted lines 61 to provide the proper voltage range desired on the tap switch contacts.

With the desired welding voltage adjusted by turning the wipers 58 to the desired position the circuit is ready for operation. As soon as the switch 54 is closed which may be performed automatically by operation of the machine, the coil 53 will be energized to connect the coil 41 of the first switch unit to its condensers 42. At this time the condensers will discharge through the coil to energize it thereby closing the main welding switch 15 and also moving the double throw switch of the next succeeding control unit to its left-hand position to connect the condensers thereof to the D. C. supply. When the switch 15 of the first unit is closed the transformer will be energized and welding current will be supplied to the electrodes. Therefore the work pieces under the electrodes of the first transformer will be welded.

The welding currents will flow as indicated diagrammatically in Figure 6, in which the solid line 62 corresponds to one phase of the secondary welding current, the dotted line 63 corresponds to a second phase and the dot-dash line 64 corresponds to the third phase. When the welding voltage 62 is positive as indicated at the left of the diagram, the voltages 63 and 64 are both negative and are of half the value as the voltage 62. The voltage and current conditions will change constantly as indicated by following the diagram to the right but under all conditions at least one voltage and current will be positive and at least one will be negative so that current will flow continuously.

Assuming that the voltage on the electrodes 11 corresponds to 62, that on electrodes 12 corresponds to 63, and that on electrodes 13 corresponds to 64, it will be seen that when the electrodes 11 are positive current will flow from these electrodes through the work and through the conductive supporting means 10 to return through the work and through the electrodes 12 and 13.

As the electrodes 12 become positive, current will flow outward through them and back through the electrodes 11 and 13. Similarly when electrodes 13 are positive current will flow out through them and back through electrodes 11 and 12. In all cases all of the current must pass through the several welds and through the supporting means so that the welding current is equalized and uniform welds result. At the same time the current is substantially continuous during the welding operation so that surges on the power supply are minimized. It will furthermore be noted that this balanced condition is maintained regardless of changes in welding voltage or time.

When the condensers 43 of the first control unit have discharged the coil 41 of that unit will be deenergized. By cutting in or out the desired number of condensers any desired welding time can be attained although for most purposes the welding time will be between two and 20 cycles. As soon as the first coil 41 is deenergized its switch 15 will open and the double throw switch for the next successive unit will return to the illustrated position to bridge contacts 51 and 52. This will connect the condensers for the second unit to the coil for that unit, the condensers having been charged while the switch was held over to bridge contacts 49 and 52 by the coil for the first unit. That this time the coil for the second unit will be energized to close the main switch 15 for the second unit and to throw the double throw switch for the third unit to its condenser charging position. At this time, the second transformer will be energized to complete a series of welds through the electrodes to which it is connected and upon completion of this welding operation the third unit will be controlled in the same manner as the second to energize its transformer for a welding operation. With this construction the several transformers are energized in cascade so that the welding load for the complete number of welds is divided and the peak load is reduced. Where further reduction is required, more than three transformers may be employed in the same manner, or where reduction of the peak load is relatively unimportant the electrodes may all be connected to the same transformer.

While one embodiment of the invention has been shown and described in detail, it will be understood that this is illustrative only and is not intended as a definition of the scope of the invention, reference being had for this purpose to the appended claims.

What is claimed is:

1. In an electric welding apparatus, a welding transformer assembly comprising a frame of electrical conducting material having at least three legs insulated from each other at one side of the frame and connected at the other side of the frame, primary windings mounted respectively in the spaces between adjacent legs on the frame and connected respectively to different phases of a source of polyphase current, the frame forming a single turn secondary for the transformer, a plurality of conductor bars of electrical conducting material extending across said one side of the frame and electrically connected with the legs respectively, and a plurality of electrode supporting members mounted on the conductor bars and electrically connected to the conductor bars respectively.

2. In an electric welding apparatus, a welding transformer assembly comprising a frame of electrical conducting material having at least three legs insulated from each other at one side of the frame and connected at the other side of the frame, primary windings mounted respectively in the spaces between adjacent legs on the frame and connected respectively to different phases of a source of polyphase current, the frame forming a single turn secondary for the transformer, a plurality of conductor bars of electrical conducting material extending across said one side of the frame and electrically connected with the legs respectively, a plurality of mounting bars of electrical conducting material mounted on the conductor bars in parallel side by side relation and electrically connected to the conductor bars respectively, and an electrode carrying bar rigidly connected at one end to each mounting bar and overlying the mounting bar in parallel spaced relation thereto resiliently to support an electrode at its other end.

3. In an electrode welding apparatus, a welding transformer assembly comprising a frame of conducting material having a plurality of legs insulated from each other at one side of the frame, primary windings on the frame connected to a source of polyphase current, the frame forming a single turn secondary for the transformer, a plurality of conductor bars extending across said one side of the frame and electrically connected with the legs respectively, a plurality of mounting bars mounted on the conductor bars in parallel side by side relation and electrically connected to the conductor bars respectively, an electrode carrying bar rigidly connected at one end to each mounting bar and overlying the mounting bar in parallel spaced relation thereto resiliently to support an electrode at its other end, and adjusting means including a spring connecting said other end of the electrode carrying bar to the adjacent end of the mounting bar to adjust the electrode pressure.

4. In an electric welding apparatus, an electrode mounting comprising an elongated rigid mounting bar, an elongated electrode carrying bar, means rigidly securing one end of the electrode carrying bar to one end of the mounting bar in electrically conductive relationship with the bars lying substantially parallel and spaced throughout the major portion of their lengths, an electrode mounted on the other end of the electrode carrying bar, a spring urging the other ends of the bars apart and adjusting means adjustably connecting the other ends of the bars to draw them together.

5. In an electric welding apparatus, a welding transformer assembly comprising a frame of conducting material having a plurality of legs insulated from each other at one side of the frame, primary windings on the frame connected to a source of polyphase current, the frame forming a single turn secondary for the transformer, a plurality of conductor bars extending across said one side of the frame and electrically connected with the legs respectively, a plurality of sets of electrode carrying bars mounted in side by side relationship on the conductor bars and electrically connected respectively to the conductor bars, electrodes on the electrode carrying bars, and a supporting member of conducting material movably mounted adjacent to the electrodes to carry parts to be welded in contact with the electrodes, circuits between the sets of electrodes being completed through the parts and the supporting member.

6. In an electric welding apparatus, a plurality of welding transformers, electrodes connected to each of the transformers, a source of direct current, a condenser and a coil for each of the transformers, switches operated by the coils to control the supply of current to the transformers respectively, a control switch for each condenser and coil having a first position in which it connects the condenser to the source and a second position in which it connects the condenser to the coil to energize the coil by discharge of the condenser, means to move the switch for the first transformer from its first to its second position to initiate a welding operation, the switches for succeeding transformers normally being in their second positions and means connected to each of the switches for a succeeding transformer and moved by the coil for the preceding transformer when it is energized to move said switches for succeeding transformers to their first positions whereby the transformers will be energized successively.

7. In a welding apparatus, a control system comprising a plurality of normally open switches to control the supply of welding current to different parts of the apparatus, a solenoid connected to each switch to close it when the solenoid is energized, a condenser for each solenoid, a source of direct voltage, and a double throw switch for each condenser and solenoid having a first position in which it connects the condenser to the source and a second position in which it connects the condenser to the solenoid, one of the double throw switches normally being in its first position and being moved to its second position to initiate an operation, each succeeding double throw switch normally being in its second position and being connected to the preceding solenoid to be moved to its first position when the preceding solenoid is energized.

References Cited in the file of this patent

UNITED STATES PATENTS

| Number | Name | Date |
|---|---|---|
| 1,108,320 | Berdon | Aug. 25, 1914 |
| 1,371,094 | Holslag | Mar. 8, 1921 |
| 1,851,184 | Holmes | Mar. 29, 1932 |
| 1,915,639 | Woofter | June 27, 1933 |
| 2,034,411 | Mitchell | Mar. 17, 1936 |
| 2,086,913 | Kelly | July 13, 1937 |
| 2,168,198 | Frink | Aug. 1, 1939 |
| 2,300,656 | Doll | Nov. 3, 1942 |